Dec. 2, 1969  R. R. REYNOLDS  3,481,282
METHOD AND APPARATUS FOR MAKING ICE CREAM SANDWICHES
Filed Sept. 9, 1966  3 Sheets-Sheet 1
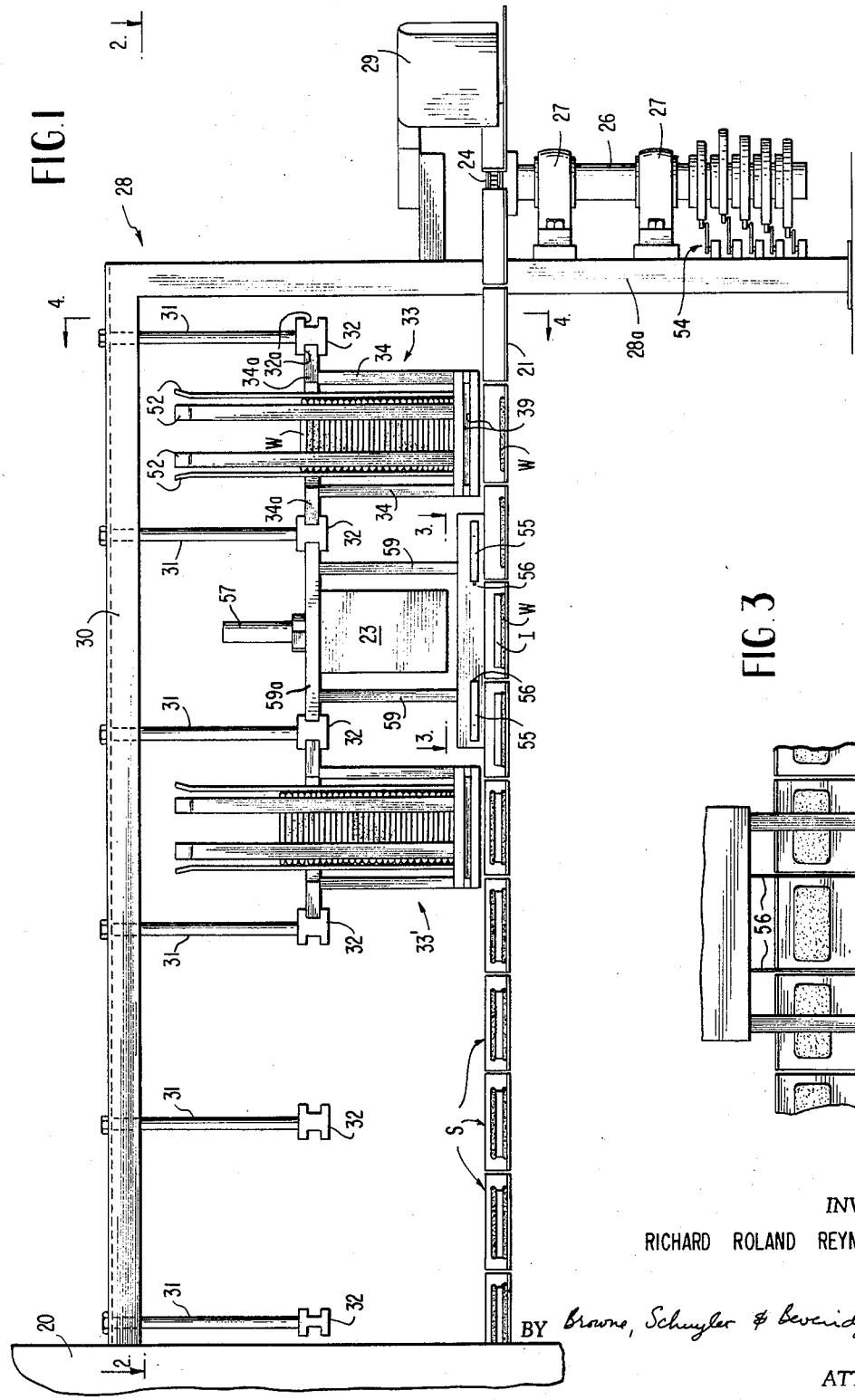
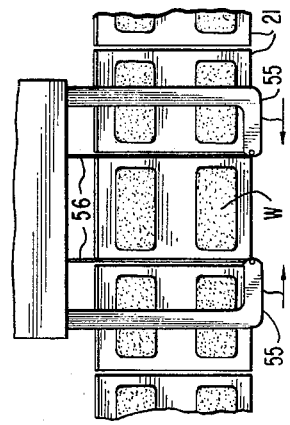
INVENTOR
RICHARD ROLAND REYNOLDS
BY Browne, Schuyler & Beveridge
ATTORNEYS

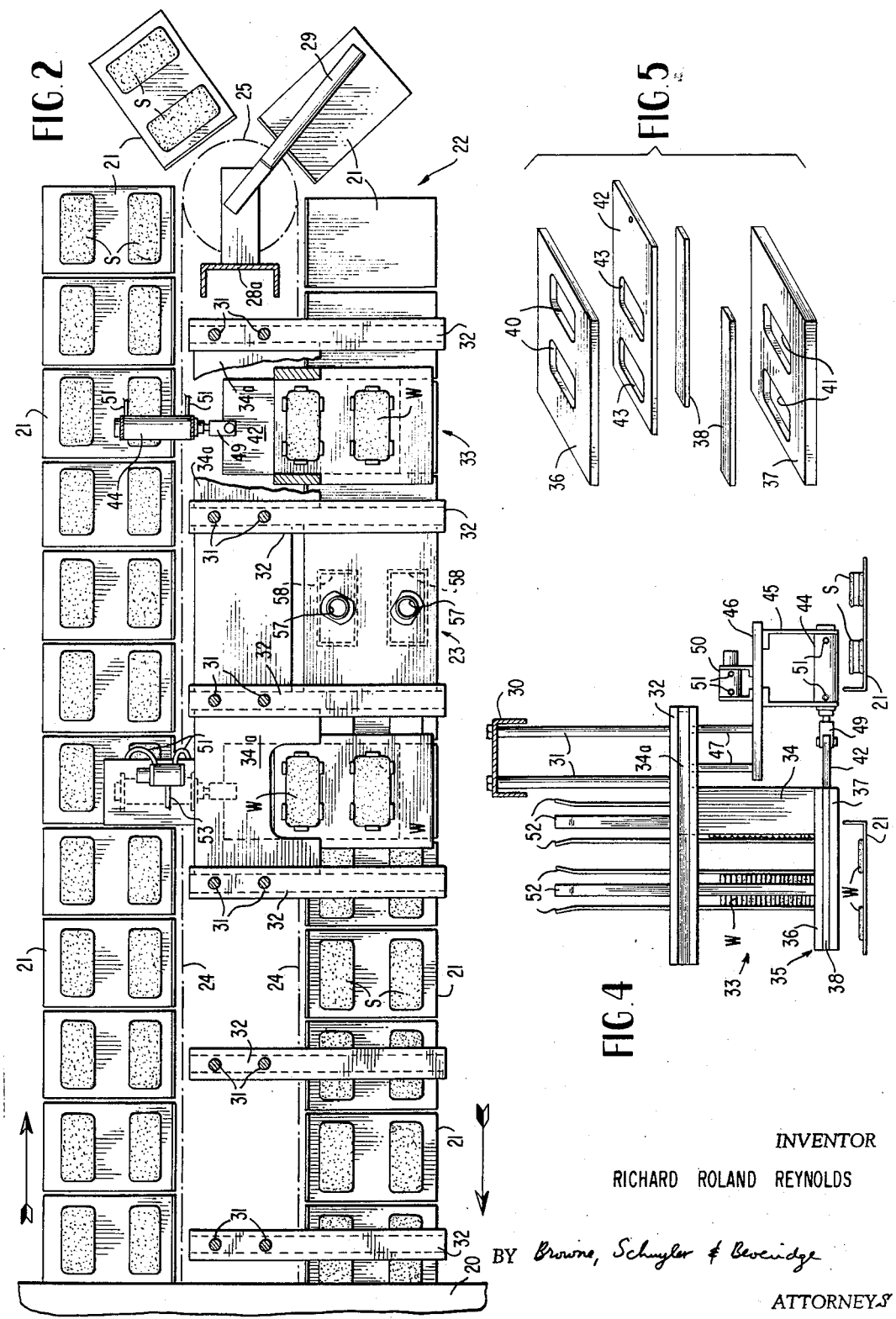

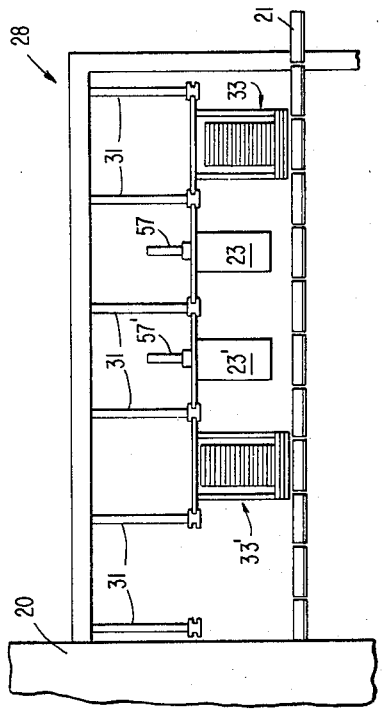
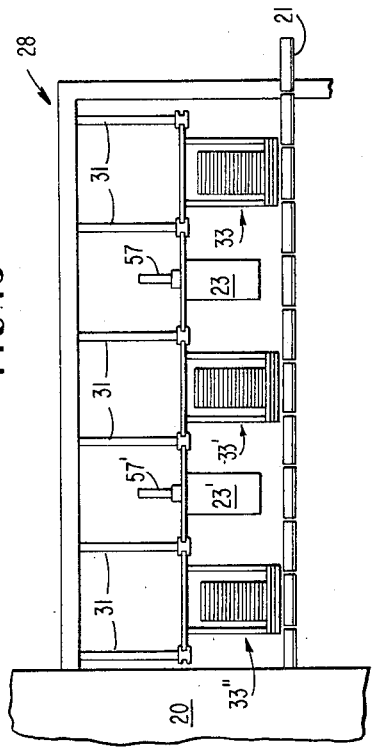
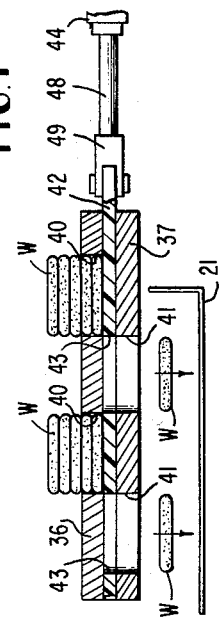
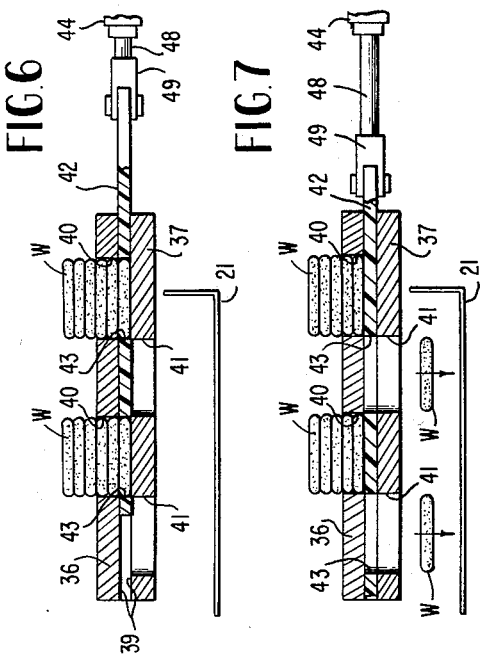
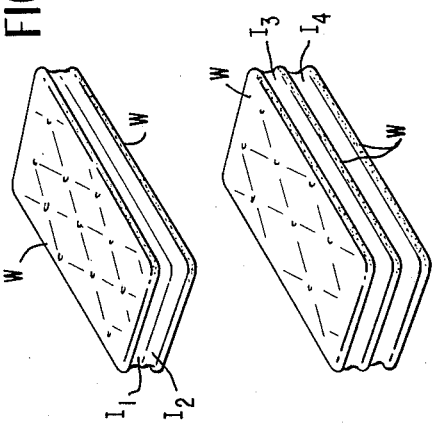

United States Patent Office 3,481,282
Patented Dec. 2, 1969

3,481,282
METHOD AND APPARATUS FOR MAKING ICE CREAM SANDWICHES
Richard Roland Reynolds, Richmond, Va., assignor to Eskimo Pie Corporation, Richmond, Va., a corporation of Delaware
Filed Sept. 9, 1966, Ser. No. 578,243
Int. Cl. A23g 5/02
U.S. Cl. 107—1                    12 Claims

ABSTRACT OF THE DISCLOSURE

This invention involves the production of sandwiches of a frozen dessert, such as ice cream. The frozen dessert in a plastic, flowable condition is continuously extruded from a downwardly facing extruder nozzle over a conveyor on which wafers have been deposited from an automatic dispenser. In timed relation to the conveyor speed, a severing element is passed through the extruded length of dessert emerging from the nozzle to sever a slice of dessert that falls onto each wafer. The conveyor with wafer and deposited dessert passes through a freezing chamber to solidify the dessert. Other dispensers and extruders in various combinations may be located over the conveyor between the initial extruder and the freezing chamber to deposit edible matter, such as wafers, or additional masses of frozen dessert on top of the dessert deposited on the wafer initially deposited on the conveyor.

---

This invention relates to a method and apparatus for producing frozen dessert sandwiches on a mass production basis by continuously extruding soft ice cream and is particularly adapted to the production of ice cream or other frozen dessert sandwiches utilizing the method and apparatus disclosed in U.S. Patent 2,739,545.

Ice cream sandwiches have previously been formed from ice cream which is continuously extruded in a plastic, soft condition from the nozzle of an extruder. However, in this prior practice wafers were placed on both sides and in close proximity to the length of ice cream as it emerged from the nozzle of an extruder and when the ice cream extended the length of the wafers, the wafers were brought into contact with the ice cream and then both moved transversely of the extruded length of ice cream, thereby severing the soft ice cream by the wiping motion of the wafers in passing across the extruded mass. The wafers with soft ice cream between them were then placed in a freezing chamber for hardening. The apparatus previously utilized is moderately complex and not particularly satisfactory. Since the wafers are utilized as the severing means, the edge of the ice cream is not clearly severed and tends to spread across the edge of the wafers. In addition, the apparatus is very specialized and will produce but one type of ice cream sandwich.

The primary object of this invention is to provide a method and apparatus for producing a wide variety of types of frozen dessert for ice cream sandwiches, including open faced sandwiches, dual flavor and double deck sandwiches.

Another object of this invention is to provide a method and apparatus which will economically produce frozen dessert sandwiches on a high production basis.

Yet another object of this invention is to provide a method and apparatus for producing frozen dessert sandwiches and adaptable to use on the Eskimo Quick Freeze Machine described in U.S. Patent 2,739,545.

These and other objects have been achieved by installing, on either side of the extruder nozzle of a continuously extruding Eskimo Quick Freeze Machine of the type described in U.S. Patent 2,739,545, apparatus for dispensing wafers onto the conveyor of the Eskimo machine and passes beneath the extruder nozzle such that the bars of frozen dessert severed from the extruded length of dsesert emerging from the extruder nozzle fall onto each wafer. Other suitable dispensers may be installed between the main extruder nozzle and the freezing chamber to deposit an additional wafer, other edible material or further layers of ice cream and wafers upon the initially deposited wafer and masses of ice cream. The conveyor carries the sandwiches into the freezing chamber of the Eskimo machine for complete hardening. After passing through the freezing chamber, the sandwiches with the ice cream in a hard frozen condition are removed from the conveyor, which again passes beneath the wafer and ice cream dispensing equipment and the process continued.

The invention will be described in more detail with reference to the following drawings in which:

FIGURE 1 is a front elevation of the sandwich making apparatus.

FIGURE 2 is a top plan view taken along section line 2—2 of FIGURE 1 with a portion broken away over the right hand.

FIGURE 3 is a fragmentary sectional plan view taken along section line 3—3 of FIGURE 1.

FIGURE 4 is an end elevation view taken along section line 4—4 of FIGURE 1.

FIGURE 5 is an exploded, perspective view of portions of the wafer dispensing unit.

FIGURE 6 is a partial cross sectional view of the wafer dispensing unit in the loading position.

FIGURE 7 is a view similar to FIGURE 6 with the unit in the wafer dispensing position.

FIGURE 8 is a front elevation similar to FIGURE 1 showing apparatus for producing the ice cream sandwich of FIGURE 9 having two adjacent layers of ice cream.

FIGURE 9 illustrates a dual flavor sandwich produced in the apparatus of FIGURE 8.

FIGURE 10 is a front elevation similar to FIGURE 8 but showing the apparatus arranged for producing a double deck ice cream sandwich illustrated in FIGURE 11.

FIGURE 11 illustrates the double deck ice cream product by the apparatus of FIGURE 10.

For the purpose of the following discussion the term "ice cream" is broadly used to mean any particular type of frozen dessert or confection whether it be ice cream, frozen ice, or other type of frozen confections.

To understand the invention, reference should first be made to FIGURES 1 and 2 in which 20 represents one end of the freezing chamber of the Eskimo Quick Freeze Machine described in U.S. Patent 2,739,545 in which the individual plates 21 of a conveyor 22 enter the freezing chamber 20 after having passed beneath the nozzles of an extruder 23, the endless conveyor 22 spiraling through the freezing chamber 20 and emerging with the confections in a hard frozen condition, the direction of the conveyor being indicated by the arrows in FIGURE 2. The conveyor plates 21 carried by suitable means, such as a chain 24, emerge and are carried away from the freezing chamber until the chain engages a gear 25 supported by the vertically disposed drive shaft 26 supported by bearings 27 on the vertical support 28 of the support structure 28, extending beyond the end portion 20 of the Eskimo machine, to reverse the direction of travel of the conveyor and carry it toward the entrance of the freezing chamber 20. A baffle 29 affixed to the support structure 28 overlies the top of the conveyor plates 21 as they pass around the gear 25 in a position to contact and remove the hardened ice cream bars from the conveyor plates before they are returned to freezing chamber 20.

Typical structure by which the mechanisms for dispensing the wafers from which the ice cream sandwiches are made is illustrated in FIGURES 1, 2 and 4. To the top horizontal beam 30 of the support structure 28 are affixed a series of pairs of downwardly depending support rods 31 spaced along the length of the beam 30 to lie above and between the conveyor lines returning to and emerging from the freezing chamber 20. A horizontal, grooved support bar 32 is affixed to the bottom of each pair of support rods 31 to extend transversely of, above and between the two conveyor lines, the various dispensing devices including the extruder being supported between adjacent support bars 32 as illustrated in FIGURE 1.

A wafer dispenser 33 is supported between the outermost two support bars 32. The dispenser is suspended by a downwardly depending dispensing block support structure 34 having a top, horizontally disposed support plate 34a which engages in the grooves 32a of the two outermost support bars 32. To the bottom of this support structure 34 is affixed the dispensing block 35 of the dispenser and it comprises an upper plate 36 and a lower plate 37 separated on opposite sides by separators 38 to leave a horizontal bore 39 defined between the upper and lower plates 36 and 37 and the two separators 38, the thickness of the separators 38 and the height of the bore 39 being substantially equal to the thickness of a wafer forming one side of a sandwich (see FIGURE 5). Two spaced apart passages 40 are cut in the upper plate 36 and a similarly shaped pair of passages 41 are cut in the lower plate 37 such that the passages in the upper and lower plates are not in vertical alignment and the cross sectional contour of both passages closely approximates the contour of the wafers which will fit within the passages. A dispensing plate 42 closely and slidably fits within the bore 39 to move axially thereof between the front and back ends of the block 35 with the dispensing plate being pierced by apertures 43 having the same cross sectional shape as the passages 40 and 41. The passages 40 and 41 in the upper and lower plates and the apertures 43 in the dispensing plates are spaced apart the same distance such that the apertures 43 are in coincidence with the passages 40 of the upper plate when the dispensing plate 42 is in the retractor loading position and when the dispensing plate is moved toward the forward end of the block to the extended, or discharged position, the apertures 43 are in coincidence with the passage 41 of the lower plate, as can be seen in FIGURES 6 and 7. A dispenser actuating cylinder 44 is supported in line with and to the rear of the dispensing plate 42 by depending fittings 45 extending downwardly from the underside of a supplementary horizontal support plate 46 which is supported by rods 47 depending downwardly from the rear portion of the top support plate 34a of the block support structure 34. The piston in the actuating cylinder 44 connects to the rear end of dispensing plate 42 by means of the piston rod 48 and the clevis and pin fitting 49. A control valve 50 having pneumatic line connections 51 leading to both ends of the cylinder 44 is supported on the top of the auxiliary support frame 46 and controls the movement of the piston in the cylinder 44 and the position of the dispensing plate 42, the control valve 50 being a conventional type used for double acting pistons in which the valve first connects the line 51 leading to one end of the cylinder 44 to an air pressure source (not illustrated) and the other line 51 leading to the opposite end of the cylinder 44 to atmosphere and the valve then reverses the connections of the two lines in the conventional manner, thereby applying pressure to alternate sides of the piston and causing it to be reciprocated in the cylinder. Vertical guide bars 52 extend upwardly around the perimeter of the passages 40 in the upper plate 46 to hold a vertical stack of wafers placed therewithin. The control valve 50 has an electrical connection 53 leading to and controlled by one of the contacts of the multi-contact switch 54 that are actuated by conveyor drive shaft 26 as indicated in FIGURE 1, thereby actuating the control valve 50 through conventional solenoid actuators and cause the piston in the cylinder 44 to reciprocate the dispensing plate 42 for dispensing wafers in timed relation to the motion of the conveyor 22.

An extruder nozzle 23 is supported between the second and third depending support rods 31 as viewed in FIGURE 1 and counting from the right side of that figure. This is a conventional extruder nozzle with downwardly facing orifices 58 of which the cross section represents the shape of the filler material for the sandwich, in this case rectangular. A severing element comprising two parallel wires 56 is affixed to reciprocating support arms 55 which move the two wires toward each other from a position slightly below and outside the extremities of the nozzle to sever a length of the dessert mixture which is extruded from the two nozzles of the extruder 23. The wires 56 are usually heated by a suitable heater to clearly sever the ice cream. The top of the extruder is connected through a pipe 57 to a source of dessert mixture under pressure which is in a plastic, flowable condition but sufficiently cold and resistant to retain its shape. The arrangement of the extruder and dual nozzles with the severing element is substantially as shown in U.S. Patent 2,739,545 or 3,196,809. The severing element support arms are actuated toward each other by a suitable reciprocating mechanism (not illustrated), as shown in the previously cited U.S. patents. This reciprocating mechanism is actuated by one of the contacts in the switch 54 in a timed relationship to the conveyor position so that the mass of ice cream extruded from the extruder orifice 57 will be severed in proper timed relationship to fall on to a wafer previously deposited on the conveyor 22 by the dispenser 33. The extruder and severing elements may be conveniently supported from the groove support bars by a depending support structure 59 of which the top portion 59a engages in the grooves 32a of the opposing support bars 32 much in the same manner as the wafer dispenser 33 is supported, or in any other desired manner. The manner of supporting the wafer dispensers and the extruder are not crucial to the invention and obviously any convenient supporting structure could be utilized.

As indicated in FIGURES 1 and 10, additional wafer dispensers may be supported on the opposite side of the extruder 23 from the first dispensing unit 33. FIGURE 1 illustrates one additional wafer dispensing unit 33' of the same configuration as the outermost wafer dispenser 33 and supported from opposing support rods 31 in the same manner as the previously described wafer dispenser unit 33. The second wafer dispenser unit 33' is actuated by one of the contacts in the switch 54 in the manner previously described relative to the first dispensing unit 33. The arrangement shown in FIGURE 1 is obviously suitable for producing ice cream sandwiches in which the layer of ice cream is disposed between two outer wafers in the manner to be subsequently described.

The apparatus illustrated in FIGURE 1 is suitable for producing a conventional sandwich S illustrated in that drawing. Just prior to each conveyor plate 21 passing beneath the lower passages 41 of the wafer dispensing unit, the contact of the switch 54, which is connected through the connection 53 to the control valve 50, actuates the control valve to move the dispensing plate 42 of the dispenser unit to the forward position, thereby carrying the lowermost wafer in each of the two stacks forward to the lower passages 41 so that the wafers drop onto the conveyor plate 21. The control valve 50 then recycles the dispenser to withdraw the dispensing plate 42 and load another pair of wafers for subsequent ejection onto the next conveyor plate 21 passing beneath the dispensing unit. Shortly before the conveyor plate with wafers passes beneath the extruder 23 the contacts of the switch 54 connected to the extruder 23 actuate the arms 55 of the severing unit to cause the heated wires 56 to close together and sever slabs of ice cream I which fall onto the wafers previously deposited on the conveyor plates 21. As the conveyor plates 21 with the wafers and deposited slabs of ice cream approach a position to be vertically below the lower passage of the second wafer dispenser unit 33', the contact of the switch 54 connected to the actuating valve of the dispenser unit 33' closes to actuate the control valve which reciprocates the dispenser plate of the second dispensing unit 33' and causes a second pair of wafers to fall onto the top of the severed masses of ice cream to complete the sandwich. The positions of the various contacts of the switch 54 must obviously be arranged relative to the motion of the shaft 26, which actuates the contacts, to cause the contacts to close and operate their respective units in proper timed relationship such that the initial wafers are deposited approximately in the center of each conveyor plate 21 and the severed mass of ice cream and subsequent wafers or other edible matter are deposited to be stacked in a vertical relationship.

Although FIGURE 1 illustrates the production of a conventional sandwich with two wafers with an interposed slab of ice cream, elimination of the second wafer dispenser 33' would obviously produce an open face sandwich. If it were desired to deposit a confection layer other than a second wafer on the open face sandwich, a conventional unit for dispensing confections, such as nuts, chocolate, etc., could be substituted for the illustrated second wafer dispenser 33' and actuated by a contact on the switch 54. As previously noted, after the sandwich is completed, the conveyor carries the sandwiches into the freezing chamber to harden the ice cream.

Other possible arrangements to produce different types of ice cream sandwiches are illustrated in FIGURES 8 and 10. The apparatus of FIGURE 8 is suitable for producing the ice cream sandwich shown in FIGURE 9 in which the confection between the two wafers W comprises two different layers of ice cream $I_1$ and $I_2$ in which these two layers can be different flavors or even different confections. In the arrangement of FIGURE 8 the wafer dispenser 33 is supported between the outermost support rods and, as in FIGURE 1, an extruder 23 is supported to adjoin the wafer dispenser unit 33. However, a second extruder 23' is supported to lie adjacent the first extruder 23 with the supply pipe 57' of the second extruder leading to a second source of soft ice cream of the desired flavor. The second wafer dispensing unit 33' is located to follow the second extruder 23'. In this arrangement, the control valves for the wafer dispensers 33 and 33' and the actuators for the severing elements of the extruders 23 and 23' are operated in appropriate timed relationship by the contacts of the switch 54 to deposit the wafers and slabs of ice cream in proper timed relationship to lie in a proper vertical relationship and produce the sandwich illustrated in FIGURE 9.

The apparatus of FIGURE 10 is obviously useful for producing the double deck sandwich illustrated in FIGURE 11 in which the slabs of ice cream $I_3$ and $I_4$ are deposited between the three wafers. As before, the first wafer dispenser 33 and the extruder 23 are supported in the first and second positions. These are followed by the second wafer dispenser 33', the second extruder 23' and the third wafer dispenser 33". The feed pipes 57 and 57' of the extruders 23 and 23' may be either connected to the same source or different source according to whether the different layers are to be the same or different flavors. As before, the control valves for the dispenser 33, 33' and 33" and the severing elements for the extruders 23 and 23' are controlled by the various contacts of the switch 54 in proper timed relationship that the various layers of the sandwich are deposited in a proper vertical array as the conveyor plates 21 pass beneath each of the respective units.

Although the wafer dispenser and the extruder illustrated in FIGURES 1–7 are each designed to simultaneously dispense two confections with each operation so that two sandwiches are produced on each conveyor plate, the design of these units could obviously be modified to dispense but one confection or more than three simultaneously.

What is claimed is:

1. A method of making ice cream sandwiches comprising the steps of:
    continuously passing a conveyor along a fixed path spaced vertically beneath the downwardly facing nozzle of an extruder,
    depositing edible wafers that are at ambient room temperature above freezing on said conveyor at spaced intervals prior to reaching said extruder nozzle,
    continuously extruding a frozen dessert mix in a plastic, shape retaining condition from said downwardly facing nozzle to emerge therefrom as a vertically depending length of mix,
    periodically, in timed relation to the movement of said conveyor, passing a severing element through said continuously emerging length of mix to form a shaped slice of frozen dessert which falls vertically and is deposited on the top of each said wafer,
    and then passing said continuously moving conveyor with wafers and deposited slices of frozen dessert through a freezing chamber to harden the frozen dessert.

2. The method of claim 1 wherein another layer of edible material is dropped onto said fixed path at a location between said extruder and freezing chamber in timed relation to the motion of said conveyor to be deposited on top of each severed mass of extruded dessert mixture and wafer.

3. The method of claim 1 wherein said other layer is a second wafer at said ambient room temperature deposited on top of the severed mass of extruded dessert mixture.

4. A method of making ice cream sandwiches comprising the steps of:
    passing a conveyor along a fixed path to pass beneath the downwardly facing nozzle of an extruder,
    depositing edible wafers on said conveyor at spaced intervals prior to reaching said extruder nozzle,
    continuously extruding a frozen dessert mix in a plastic, shape retaining condition from said nozzle,
    periodically, in timed relation to the movement of said conveyor, passing a severing element through the mixture emerging from said nozzle to sever a shaped mass from said extruded length which falls and is deposited on the top of each said wafer,
    locating a nozzle of a second extruder above said fixed path between said nozzle of the first extruder and said freezing chamber,
    continuously extruding a frozen dessert mixture in a plastic, shape retaining condition from said nozzle of the second extruder to emerge as a continuously extruded length of dessert mixture,
    periodically, in timed relation to the movement of said conveyor, passing a severing element through the mixture emerging from said nozzle of the second extruder to sever a mass of extruded dessert mixture for deposit on the top of the mass of dessert mixture from said first extruder previously deposited on each wafer,
    and passing said conveyor with wafers and deposited frozen dessert into a freezing chamber to completely harden the frozen dessert.

5. The method of claim 4 additionally comprising the step of dropping a second wafer onto said conveyor between said nozzle of the second extruder and said freezing chamber in timed relation to the movement of said conveyor to be deposited atop the severed mass of dessert from said nozzle of the second extruder and underlying matter on each said wafer.

6. A method of making ice cream sandwiches comprising the steps of:

passing a conveyor along a fixed path to pass beneath the downwardly facing nozzle of an extruder, depositing edible wafers on said conveyor at spaced intervals prior to reaching said extruder nozzle, continuously extruding a frozen dessert mix in a plastic, shape retaining condition from said nozzle, periodically, in timed relation to the movement of said conveyor, passing a severing element through the mixture emerging from said nozzle to sever a shaped mass from said extruded length which falls and is deposited on the top of each said wafer, in timed relation to the motion of said conveyor depositing a second wafer on top of each severed mass of extruded dessert mixture and wafer, locating a nozzle of a second extruder above said fixed path between the location where said second wafer is deposited and said freezing chamber, continuously extruding a frozen dessert from the nozzle of said second extruder to emerge as a continuously extruded length of dessert mixture in a plastic, shape retaining condition, periodically, in timed relation to the movement of said conveyor, passing a severing element through the length of dessert emerging from the nozzle of said second extruder to sever a mass of extruded dessert mixture which falls and is deposited on top of said second wafer previously deposited, and passing said conveyor with wafers and deposited frozen dessert into a freezing chamber to completely harden the frozen dessert.

7. The method of claim 6 additionally comprising the step of depositing in timed relation to the motion of said conveyor a third wafer on top of the severed mass of extruded dessert from said second extruder before passing into said freezing chamber.

8. An apparatus for making an ice cream sandwich comprising:

an endless conveyor, a freezing chamber, means for moving said conveyor along a fixed path externally of said freezing chamber and thence through said freezing chamber, a downwardly facing extruder nozzle of established cross sectional shape located above said fixed path, means for depositing wafers at spaced intervals on said conveyor between said extruder and the exit of said freezing chamber comprising:

a block having a horizontal bore of uniform cross section extending between opposite end faces and having a pair of non-aligned, substantially vertical passages spaced along said bore of which a first passage extends upwardly from said bore through the top of said block and the second passage extends vertically downward from said bore through the bottom of said block, said passages having a cross sectional shape substantially conforming to said wafers to contain a wafer therewithin, means connecting to the top of said block for holding a stack of wafers in vertical alignment with said first passage with the lowermost wafers of said stack fitting within said first passage, a dispensing plate closely and slidably fitting within said horizontal bore for movement axially therein and pierced by an aperture conforming to the cross sectional shape of said vertical passages, said dispensing plate having a thickness closely approximating that of a wafer, means for moving said plate within said bore between a loading position in which said aperture is aligned below said first vertical passage to load a wafer into said aperture and a discharge position in which said aperture is aligned with said second vertical passage and the wafer in said aperture is discharged therefrom, and means operable in timed relation to said conveyor moving means for actuating said plate moving means from said loading position to said discharge position and return, means for continuously supplying under pressure to said extruder nozzle a frozen dessert mixture in a plastic shape retaining condition to emerge as a downwardly depending length of mixture having the cross sectional shape of said nozzle, a severing means movable across the lower end of said nozzle transversely through the depending length of dessert mixture to sever a shaped mass of dessert therefrom, and means for actuating said severing means in timed relation to said conveyor moving means to sever a mass of shaped dessert mixture for deposit on each wafer passing therebeneath.

9. The apparatus of claim 8 additionally comprising:

a downwardly facing nozzle of a second extruder having an established cross sectional shape located above said fixed path between said first named extruder nozzle and the entrance to said freezing chamber, means for continuously supplying under pressure to said second nozzle a frozen dessert mixture in a plastic, shape retaining condition to emerge as a downwardly depending length of mixture having the cross sectional shape of said second nozzle, a second severing means movable across the lower end of said second nozzle transversely through the depending length of dessert mixture to sever a shaped mass of dessert mixture therefrom, means for actuating said second severing means in timed relation to said conveyor moving means to sever a mass of shaped dessert for deposit on each mass of dessert from said first extruder nozzle deposited on a wafer passing therebeneath, between said second extruder and the entrance to said freezing chamber, a second block having a horizontal bore of uniform cross section extending between opposite end faces and having a pair of non-aligned, substantially vertical passages spaced along said bore of which a first passage extends upwardly from said bore through the top of said second block and a second passage extends vertically downwardly from said bore through the bottom of said second block, said passages having a cross sectional shape substantially conforming to that of said wafers which fit therewithin, means connecting to the top of said second block for holding a stack of wafers in vertical alignment with said first passage with the lowermost wafer of said stack fitting within said first passage, a dispensing plate closely and slidably fitting within said horizontal bore for movement axially therewithin and pierced by an aperture conforming to the cross sectional shape of said vertical passages, said dispensing plate having a thickness closely approximating that of a wafer, means for moving said plate within said bore between a loading position in which said aperture is aligned below said first vertical passage to load a wafer into said aperture and a discharge position in which said aperture is aligned with said second vertical passage and the wafer in said aperture is discharged therefrom, and means operable in timed relation to said conveyor moving means for actuating said plate moving means from said loading position to said discharge passage and return.

10. The apparatus of claim 8 additionally comprising means for depositing a second layer of edible matter on the top of each mass of dessert mixture previously deposited on each wafer and located above said conveyor on said fixed path between said extruder and the entrance to said freezing chamber.

11. The apparatus of claim 10 wherein said means for depositing said second layer of edible material comprises a second block having a horizontal bore of uniform cross section extending between opposite end faces and having a pair of nonaligned, substantially vertical passages spaced along said bore of which a first passage extends upwardly from said bore through the top of said second block and a second passage extends vertically downward from said bore through the bottom of said second block, said passages of said second block having a cross sectional shape substantially conforming to that of said wafers which fit therewithin, means for connecting the top of said second block for holding a stack of wafers in vertical alignment with said first passage with the lower wafers of said stack fitting within said first passage.

a dispensing plate closely and slidably fitting within the horizontal bore of said second block for movement axially therewithin and pierced by an aperture conforming to the cross sectional shape of said vertical passages, said dispensing plate of said second block having a thickness closely approximating that of a wafer, means for moving said plate within said bore of the second block between a loading position in which said aperture is aligned below said first passage to load a wafer into said aperture and a discharge position in which said aperture is aligned with said second vertical passage and the wafer in said aperture is discharged therefrom, and means operably in timed relation to said conveyor moving means for actuating said plate moving means of the second block from said loading position to said discharge position and return.

12. The apparatus of claim 11 additionally comprising a nozzle of a second extruder having an established cross sectional shape located above said fixed path between said second block and the entrance of said freezing chamber, means for continuously supplying under pressure to said nozzle of the second extruder a frozen dessert mixture in a plastic, shape retaining condition to emerge from said second nozzle as a downwardly depending length of dessert mixture having the cross sectional shape of said second nozzle, a second severing means movable across the lower end of said second nozzle through the depending length of said dessert mixture to sever a shaped mass of dessert therefrom, means for actuating said second severing means in timed relation to said conveyor moving means to sever a mass of shaped dessert for deposit on top of the wafer deposited from said second block, a third block having a horizontal bore of uniform cross section extending between opposite end faces and having a pair of non-aligned, substantially vertical passages spaced along said bore of which a first passage extends upwardly from said bore through the top of said third block and a second passage extending vertically downwardly from said bore through the bottom of said third block, said passages of the third block having a cross sectional shape substantially conforming to that of said wafers which fit therewithin, means connecting to the top of said third block for holding a stack of wafers in vertical alignment with said first passage with the lowermost wafers of said stack fitting within said first passage, a dispensing plate closely and slidably fitting within said horizontal bore of the third block for movement axially therewithin and pierced by and aperture conforming to the cross sectional shape of said vertical passages, said dispensing plate of the third block having a thickness closely approximating that of a wafer, means for moving said plate of the third block within said bore between a loading position in which said aperture is aligned below said first vertical passage to load a wafer into said aperture and a discharge position in which said aperture is aligned with said second vertical passage and the wafer in said aperture is discharged therefrom, and means operable in timed relation to said conveyor moving means for actuating said plate moving means of the third block from said loading position to said discharge position and return to deposit a wafer on the top of the second mass of frozen dessert deposited previously from the nozzle of said second extruder.

References Cited

UNITED STATES PATENTS

| | | |
|---|---|---|
| 2,739,545 | 3/1956 | Nelson. |
| 2,875,708 | 3/1959 | Hensgen. |
| 3,150,614 | 9/1964 | Scarpa. |
| 3,307,499 | 3/1967 | Bergstrom. |
| 2,356,853 | 8/1944 | Keller _____ 107—1 |
| 3,385,234 | 5/1968 | Anderson _____ 107—7 |

EDWARD L. ROBERTS, Primary Examiner

U.S. Cl. X.R.

107—7, 14